United States Patent Office 3,394,751
Patented July 30, 1968

3,394,751
PNEUMATIC EXPANSIBLE TIRE WITH FOLDING SIDEWALLS AND RUBBER CUSHIONS AT THE BEADS
James Sidles, West Richfield, John F. Heimovics, Stow, William N. Dickerson, Kent, and George Dolak, Macedonia, Ohio, assignors to The B. F. Goodrich Company, New York, N.Y., a corporation of New York
Filed Aug. 5, 1966, Ser. No. 570,571
8 Claims. (Cl. 152—330)

ABSTRACT OF THE DISCLOSURE

An expansible tire of the type which is inflatable to a generally toroidal shape and which collapses on deflation by having the tread and carcass portions elastically contract to a smaller diameter, and by having the sidewalls fold on themselves inside the tread, has an elastic rubber cushion molded along the outside area of each bead region. The cushions are generally unstressed in the folded deflated condition of the tire can assist in supporting the tread margins on the rim flanges when the tire is run under load in its deflated condition.

---

This invention relates to pneumatic tires and more particularly to an improved expansible-type pneumatic tire which operates when normally inflated with a much softer ride than a conventional tire, and which is also adapted to collapse on deflation and operate with unusual rolling stability when the tire is fully deflated or "flat." One important feature of this improved tire is that even when it is fully inflated, its sidewalls include concave folds, a feature apparently contributing to the softness of the ride the tire provides.

The improved expansible tire of this invention is made with conventional service proven tire-making materials and components. It includes the usual pair of laterally spaced annular inextensible beads, with an interconnecting flexible annular carcass of elastomer-coated tire ply fabric, and an external ground-engaging tread capable of significant elastic expansion in circumference. The tire is molded with deep flexible folds permanently set into the sidewall regions so that each sidewall region is folded on itself axially inside the tread, and the tread is circumferentially contracted toward the beads when the tire is deflated. Accordingly, the external diameter of the tire may be in the order of 30–40% smaller when deflated than when it is inflated.

The tire of this invention is not a mere emergency tire, even though it has excellent run-flat capabilities. It may be used for ordinary continuous inflated service on the load-carrying wheels of a passenger auto, truck or similar vehicle. In its collapsed or deflated state it is, of course, convenient to store because it occupies a much smaller space than a conventional tire for the same purpose.

Structurally, this improved tire differs primarily from sidewall-folding type expansible tires earlier proposed in that this tire includes a large extra cushion of elastic rubber extending circumferentially around the tire on the outside surface of each bead. This cushion extends between the side of the bead and the adjoining rim flange. The cushion is in a relaxed or unstrained state when the tire is collapsed and it also supports the tread margins when the tire is collapsed.

During inflation, the flexible folded portions of each sidewall region are laterally displaced so that the sidewalls flexibly unfold, and the carcass portion is elastically expanded by the inflation medium so that the tire tread grows larger and more nearly assumes the characteristic open-bellied toroidal shape of a common pneumatic tire. The lateral unfolding of the sidewalls tends to compress the extra cushion of rubber at the bead, and we have found, quite unexpectedly, that the compression of this cushion tends to limit the extent to which the sidewalls are capable of laterally unfolding. Where the bead cushion is selected large enough, it prevents the sidewalls from reverse folding into the usual convex configuration. Instead, although the tread expands to its normal diameter, the sidewalls in this tire retain a concave configuration. This in turn makes the sidewalls quite flexible under load and makes the tire in the order of 20% softer than the corresponding size conventional tire, with only a minimal, unobjectionable, reduction in lateral stability.

The elasticity of the compressed bead cushion cooperates with the normal resilience of the sidewalls to assist in refolding the sidewalls under the tread when the tire is deflated, or when it loses inflation pressure by puncture or other damage. When the tire is deflated and its sidewalls folded, it will roll under normal load on its associated wheel with unusually good stability because the tread margins are supported on the bead cushions. Accordingly the tread remains in good alignment with the wheel rim and concentric with it and can operate practically like a solid tire if it should be deflated in service by damage or for other causes. In contrast, a conventional pneumatic tire wobbles very unstably on its rim when rolling under load in deflated condition and will be quickly destroyed, unless the tread is supported by independent devices such as rigid or inflatable supports on the wheel rim inside the tire.

The bead cushions may be circumferentially continuous or they may include narrow grooves generally radially of the cushion.

The invention will be further explained with reference to the accompanying drawings which show, by way of example, one preferred tire for passenger automobiles made according to and embodying this invention. In the drawings.

Figure 1:
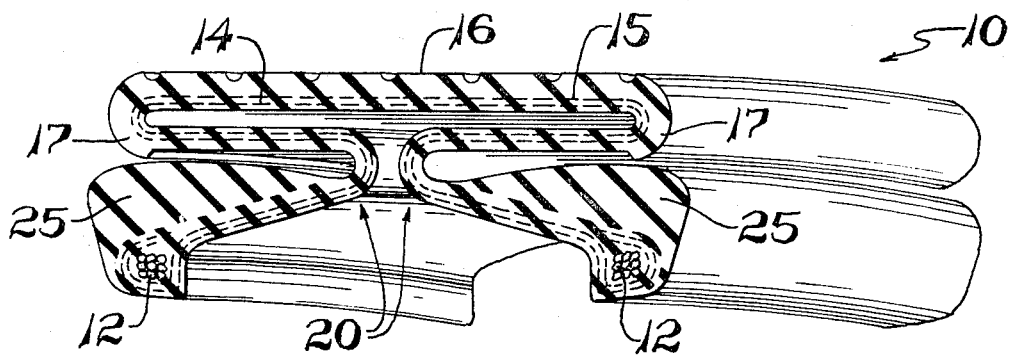
FIG. 1 shows a cross section of the tire with portions of its folded sidewalls and beads shown in perspective.
Figure 4:
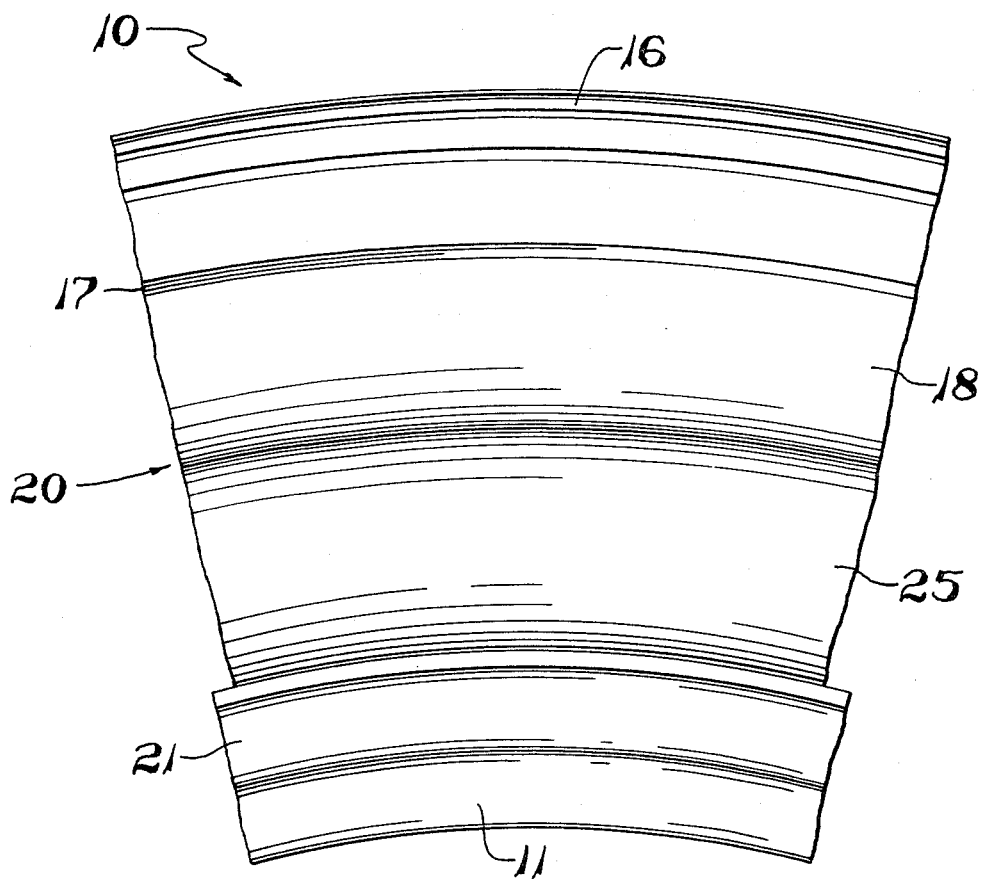
FIG. 4 is a side elevation of a part of the tire showing the position of the tread-supporting ribs when the tire is inflated.

Referring to the drawings, the tire 10 is mounted on a standard drop-center type automotive rim 11. Structurally, the tire 10 has a pair of annular laterally spaced inextensible beads 12 with a flexible carcass 13 extending between and fastened to each of the beads. The carcass includes two fabric plies 14, 15 and an external ground-engaging tread portion 16.

The foregoing components of the tire are preferably made of conventional tire-making materials. The beads 12 are preferably wire-wound grommets and the plies 14 and 15 are fastened to the beads all in accordance with common industry practice for building passenger car tires. The plies 14 and 15 are preferably conventional tire cord fabrics (wefted or weftless) such as nylon, rayon, or special polyester cords. The elastomeric coatings on the fabrics are likewise conventional tire-making rubber compounds, as is the tread region 16.

Figure 2:
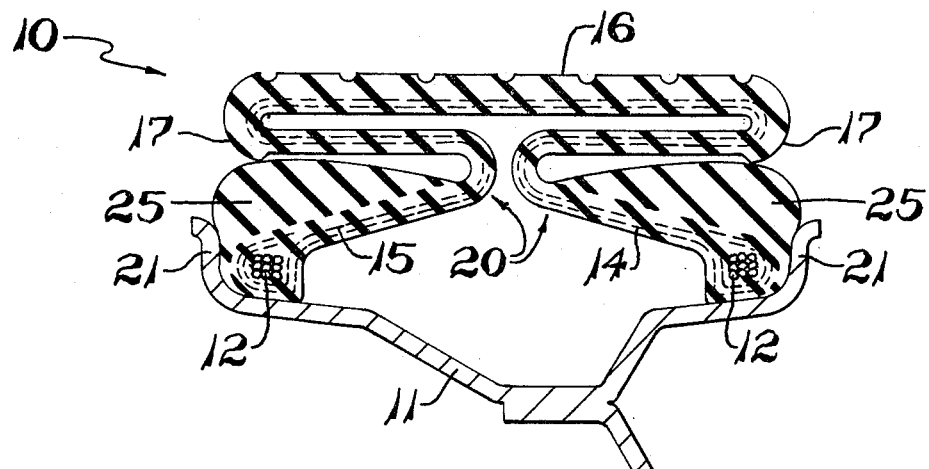
FIG. 2 shows a cross section through a tire-and-wheel rim assembly with the tire collapsed and folded.

Additionally, the carcass of this tire may be built on conventional passenger tire production machinery. That is to say, the tire may be built in cylindrical form according to the so-called flat band tire-making method. The tire cord material from which the plies 14–15 are made is initially coated with an elastomer and then bias cut and laid with the cord angle of successive plies opposing each other in the usual manner. The resulting cylindrical green tire carcass is then axially compressed into a special mold (not shown) which has a molding surface contour for imparting to the tire a permanent molded configuration substantially as shown in FIGS. 1 and 2.

For passenger car service this tire is preferably molded with a generally "flat" or cylindrical tread portion 16 which has its lateral margins or tread shoulders 17 merging with thinner sidewall regions 18 leading to the beads 12. Each sidewall region 18 is molded so that it has a permanent flexible hairpin-shaped fold 20 extending circumferentially around the tire. That is to say, each sidewall region 18 is folded on itself during the molding operation so that in the deflated condition of the tire, most of the sidewall region between the bead and the tread shoulder extends axially inward and is generally concentric with the tread region 16. The folded regions 20 define in the deflated condition an annular reentrant channel open to the exposed or outside surface of the tire.

Along the outside surface of each foldable sidewall 18 closely adjoining the beads there is a thick rubber cushion 25 molded integrally with the tire. Each cushion 25 extends circumferentially of its sidewall and from a point close to the bead heel to a location on the radially inward folded portion of the sidewall. The cushion 25 has its maximum thickness slightly above the bead where the sidewall starts to fold inwardly (see FIGS. 1 and 2) and it tapers from this thick region to blend smoothly into the folded sidewall area and the bead area. In the collapsed condition of the tire the upper or radially outer folded portion of the sidewall engages and rests upon the thick portion of the cushion 25 as shown in FIG. 2, thereby providing radial support for the overlying tread margins. When a radial load is exerted on tread 16, it will be apparent that the cushion 25, at least in the footprint area, will transmit this load to the beads and rigid wheel, thereby cushioning the tread, and minimizing cutting of the tread against the beads and rim flange, and it will also maintain the tread in alignment with the wheel rim and reasonably concentric with the wheel.

The cushion 25 is built into the carcass during the building procedure and is vulcanized integrally to the tire. The cushion is highly resilient and it is in its relaxed or unstrained state when the tire is collapsed and folded as in FIGS. 1 and 2. The cushion could include internal fabric but preferably it is "gum" stock about like that normally used for tire treads.

The beads 12 of the tire are preferably molded so that they form an interference fit with the adjoining bead seat regions of the wheel rim along the internal surface of the rim flanges 21.

The tire preferably further includes the usual materials and features to enable the tire to operate satisfactorily in tubeless condition. The tire may be inflated or deflated by a standard rim-mounted inflation valve (not shown).

After the tire is initially mounted on its rim 11, preferably it is inflated just enough to wedge the beads 12 tightly against the respective bead seals of the rim. Thereafter with the tire fully deflated, the beads normally tend to remain snugly seated in the bead seats in the manner shown. To assist in maintaining the beads properly seated after a mounted tire is deflated, the tire is preferably molded with the beads 12 spaced laterally a slightly greater distance than the actual distance between the inside surfaces of the rim flanges 21.

To place the resulting tire-and-rim assembly in load-carrying service, any suitable inflation mechanism may be used to inflate the tire. Progressive inflation of the tire stretches the carcass circumferentially in the tread region 16 and progressively unfolds the sidewall regions 18 in a lateral direction. The apices of the folds, indicated by numerals 20, are displaced laterally away from each other during this operation and as the sidewalls unfold, their cushions 25 are highly compressed toward the rim flanges to resist the unfolding action. As noted in the foregoing, we have found that the cushions 25 eventually limit the extent to which the sidewalls can be unfolded. In a passenger auto tire, for example, we have found that the bead cushions 25 are so highly compressed during inflation that even at inflation pressures significantly higher than would be normally used, the sidewalls remain folded concavely in about the manner shown in FIG. 3. Increasing the inflation pressures still further effects relatively little additional unfolding. Apparently the cushions 25 are under very high compression under these conditions to provide a barrier which prevents the sidewalls from reversing the direction of their initially molded fold 20 and assuming their traditional convex inflated shape.

Figure 3:
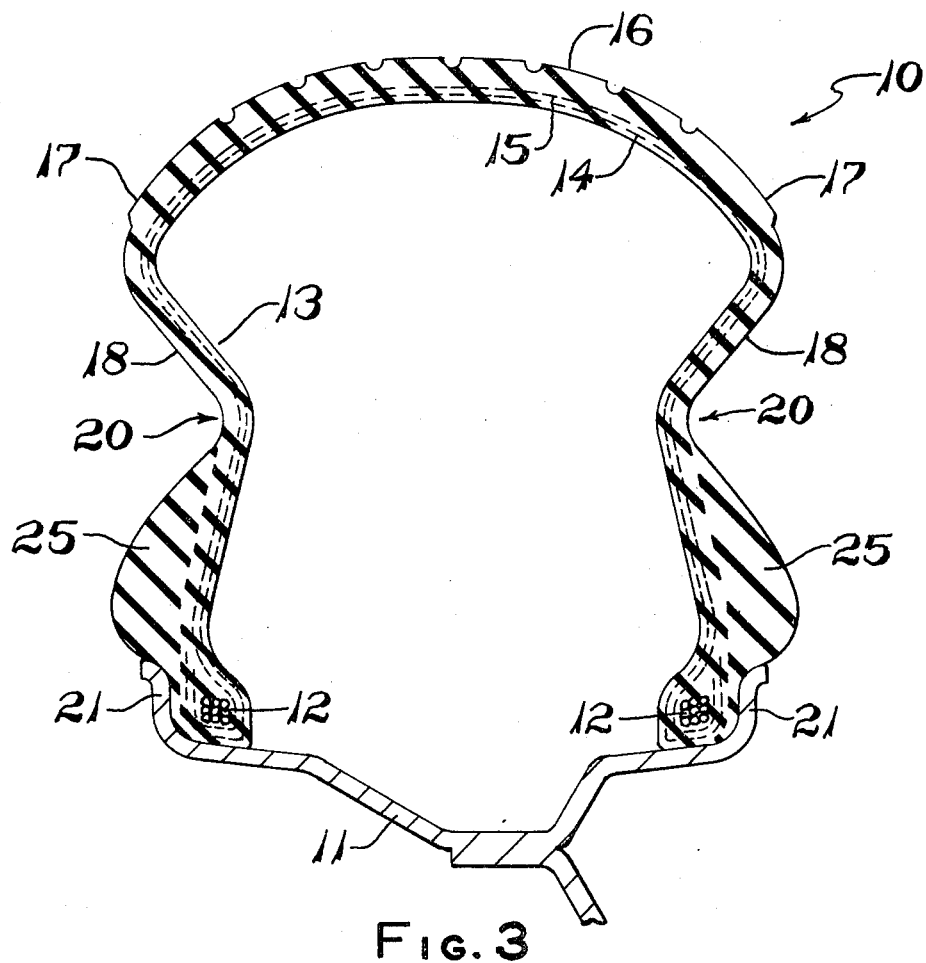
FIG. 3 shows a cross section like FIG. 2 except that the tire is inflated.

The concave sidewall shape of FIG. 3 has provided the most unexpected advantage of being radially much softer under load than a corresponding tire under the same conditions, with no objectionable loss in rolling stability. These tires do not, for example, display as good a cornering stabiilty as conventional tires, but their stability in this respect is quite adequate for automotive use.

When the tire is deflated (deliberately or through damage) the highly compressed cushions 25 expand like springs, immediately tending to refold the sidewalls to their original molded position as shown in FIGS. 1 and 2. In this position, the tread margins are firmly supported on the cushions 25 so that the tire continues to have excellent rolling stability and can operate for many miles in deflated condition without damaging or destroying the tire.

For emergency use in passenger cars, this improved tire may have a significantly thinner tread than would ordinarily be used with a conventional passenger car tire. The thinner tread emergency tire would be operated in load-carrying service only for a period sufficient to enable the main wheel tire to be repaired. By an appropriate selection of the tread dimensions and tread and carcass materials, however, the mileage available for a tire of this class may be varied significantly.

The carcass portion of this tire is capable of accommodating the unusually great circumferential elongation of the tread region between the deflated and inflated condition by a combination of the elasticity of the elastomer matrix in which the tire cord fabric is molded and by the pantographing action of the tire cords in the plies 14, 15. A typical type passenger car tire made according to this invention may be built up by wrapping elastomeric coated plies of tire cord 14 and 15 about a cylindrical building drum with the cords forming an angle to the circumference of the building drum of about 60 to 65° At the conclusion of the building stage, the resulting cylindrical green tire casing is then axially compressed and molded substantially to the shape shown in the solid lines in the drawing.

The steps of shaping the green carcass and molding it may shift the original cord angle in the tread region to about 55–60° to the circumference (or the medial center plane) of the tread. This relatively small shift or "pantographing" of the cords during the molding results from the relatively low profile of the tire and it is very much less than the corresponding action of the cords which normally occurs where a similarly built tire is cured in the familiar toroidal form.

A much greater pantographing or cord angle shift occurs, however, in the tread region of this type tire during its inflation after it is fully cured. The angle of the cords of the plies 14 and 15 in the tread region may shift from about 55–60° when the cured tire is in deflated condition, to about 35–45° when the tire is fully inflated. In each case the angle noted is measured from the medial circumference or medial center line of the tire tread. Similar shifts in cord angle occur in the sidewalls but not necessarily to the same extent as in the tread portion. The elastic character of the elastomer matrix in which the cords are molded permits such a radical pantographing action of the cords between the inflated and deflated condition. The tire cords themselves in this tire are not intended to and do not themselves appreciably elongate during the elastic expansion of the tire carcass as it is inflated. The remarks in the foregoing description about the expansion of the tire carcass are intended to refer to an expansion involving a shifting or pantographing action of the tire cords. A tire carcass does not stretch uniformly in all directions when inflated like a homogeneous wall pressure vessel such as a simple balloon.

The foregoing angular ranges have been cited merely to illustrate the order of magnitude of the changes in cord angle in the tread region which occurs in one specfic size passenger car tire from the time the carcass plies are laid up on the cylindrical building drum to the time the tire is fully inflated. The actual selection of cord angles in making these tires will follow conventional practice and will depend primarily on the ultimate shape desired for the tire cross section after it is fully inflated and also on the intended service for the tire. In aircraft tires, for example, the cord angles of the several plies may undergo even greater proportional change than those described in the foregoing example.

The cord angle shifting effect which occurs in this type tire also occurs in other common pneumatic tires. There is a much greater shift in this type tire, however, during its inflation than ordinarily would occur in common tires.

The folds in the sidewall regions 18 of the illustrated tire are in substantial axial alignment with each other. Each extends almost to the medial circumferential center line of the tread region 16. The axial depth of each fold 20 may be varied depending on the size and shape desired for the inflated configuration of the tire. If the folds are more shallow than those illustrated, the radial width of the inflated tire would be correspondingly reduced. On the other hand, the radial width of the tire in its inflated condition may be significantly increased by forming the folds 20 of deeper or greater axial extent than those shown and making the folds so that one concentrically overlaps the other.

For aircraft, truck or other heavy-duty service, a tire according to this invention may be made with a great many more plies than the two shown in the drawing, and ordinarily such tires would have a much thicker tread region. Such tires may additionally include other special structural details such as fabric reinforcements of the tread. In any case, however, such tires may be made with at least one permanent inwardly folded region in the sidewall portion of the carcass and a cushion 25 in accordance with the principles of this invention.

The cushions 25 need not be circumferentially continuous as shown. For example, they may have narrow radial grooves (not shown) intersecting their outside surface, or they may be otherwise discontinuous so long as they provide adequate support for the tread margins when the tire is collapsed, and sufficient compression resistance to limit the unfolding of the sidewalls.

What is claimed is:

1. A pneumatic tire comprising a pair of laterally spaced annular beads and an annular flexible carcass of elastomer-coated fabric with a circumferential tread region and opposing sidewall regions between said tread region and each bead, at least one sidewall region having a flexible fold permanently set in the sidewall region, the fold extending circumferentially of the carcass in a continuous reentrant channel open to the outside surface of the sidewall in the deflated condition of the tire and adapted to unfold from such position when the tire is inflated, and means for limiting the unfolding movement of said sidewall so that the sidewall is concave on its outside surface at normal inflation pressure.

2. A tire according to claim 1 wherein said means comprises elastic material deformable by the unfolding action of the sidewall to resist and limit the range of movement of said sidewall during inflation.

3. A tire according to claim 2 wherein said elastic material is disposed along the bead of the tire and is compressed by the unfolding movement of the sidewall to progressively resist such unfolding movement.

4. A tire according to claim 3 wherein said elastic material is disposed along the outside surface of the bead region of the tire to support the tread margins when the tire is deflated.

5. A tire according to claim 3 wherein said elastic material is disposed along the outside surface of the bead region of the tire to engage and support the opposing folded region of the sidewall underlying the tread margins when the tire is deflated.

6. A pneumatic tire comprising laterally spaced beads, and a carcass of elastomer-covered fabric which includes a ground-engaging external tread region and opposing flexible sidewall regions between the tread and the bead, each sidewall region having a flexible fold permanently set in the sidewall region, each fold including a reversely bent portion and two opposing folded sidewall areas, one area extending from said reversely bent portion to the margin of said tread portion, and the other extending to the adjoining bead, thereby forming a continuous reentrant channel open to the outside surface of the carcass and underlying said tread region, and a cushion of elastic material on the outside surface of each bead for limiting the unfolding movement of said sidewalls so that each sidewall is concave on its outside surface at normal inflation pressure.

7. A pneumatic tire including a pair of laterally spaced annular bead portions and an annular flexible elastically distensible carcass of load-carrying elastomer-coated fabric plies with a circumferential tread region and opposing flexible sidewall regions between said tread region and each bead portion, a flexible fold permanently set in each of the sidewall regions; the folds extending circumferentially of the carcass in a continuous reentrant channel open to the outside surface of the sidewalls in the deflated condition of the tire with the apices of the sidewall folds having a diameter about the same size as the diameters of their respective bead portions, said carcass being adapted to distend and said sidewall being adapted to unfold to assume a generally toroidal shape when the tire is inflated, and characterized in that each bead portion includes a cushion of elastic material along the outside surface thereof which is substantially unstressed in the deflated condition of the tire, each said cushion being adapted for progressive compression against an external wheel portion when the tire is inflated to augment the refolding of the adjoining sidewall.

8. A tire according to claim 7 and further characterized in that said cushions are proportioned to support the tread margins on the underlying bead portions in the deflated condition of the tire.

References Cited

UNITED STATES PATENTS 3,347,301   10/1967   Sidles _____ 152—352

ARTHUR L. LA POINT, *Primary Examiner.*

C. B. LYON, *Assistant Examiner.*

UNITED STATES PATENT OFFICE
CERTIFICATE OF CORRECTION

Patent No. 3,394,751                              July 30, 1968

James Sidles et al.

It is certified that error appears in the above identified patent and that said Letters Patent are hereby corrected as shown below:

Column 3, line 59, "seals" should read -- seats --. Column 4, line 17, after "corresponding" insert -- conventional --; line 20, "stabiilty" should read -- stability --. Column 6, after line 65 insert the following references:

```
2,751,959  6/1956  Blomquist  ---------- 152-352XR
3,052,429  9/1962  Simon et al.  ------- 152-330XR
3,116,778  1/1964  Herzegh et al.  ----- 152-330
```

Signed and sealed this 30th day of December 1969.

(SEAL)
Attest:

Edward M. Fletcher, Jr.                            WILLIAM E. SCHUYLER, JR.
Attesting Officer                                              Commissioner of Patents